June 2, 1936.　　A. C. VAN HOOYDONK　　2,043,216
FOOD CHOPPING MACHINE
Filed July 18, 1932　　3 Sheets-Sheet 1
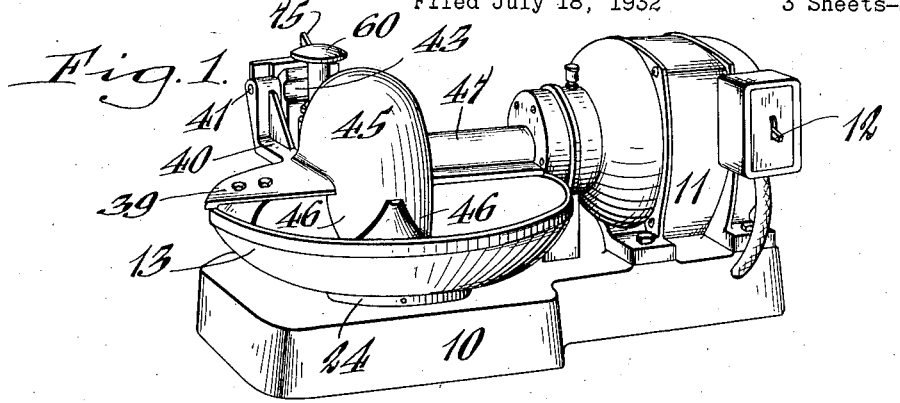
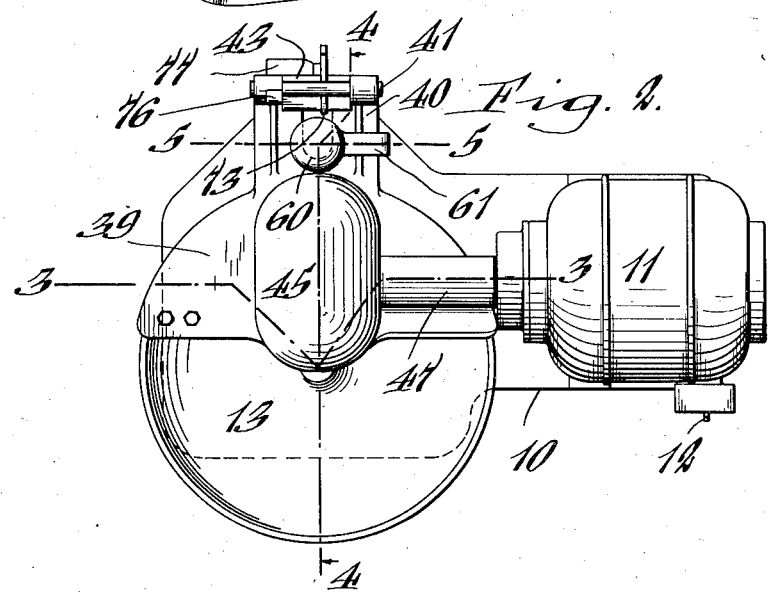
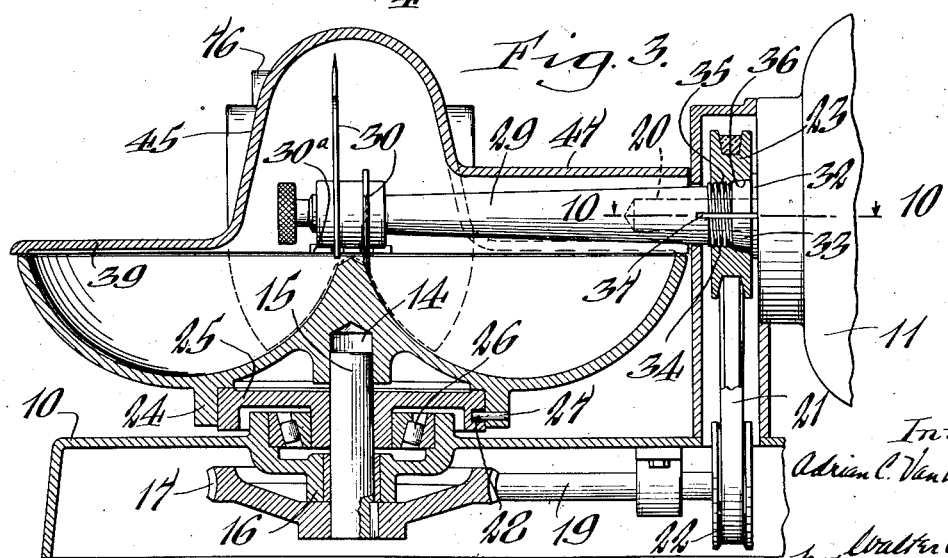
Inventor,
Adrian C. Van Hooydonk,
by Walter P. Guyer
Attorney.

June 2, 1936.  A. C. VAN HOOYDONK  2,043,216
FOOD CHOPPING MACHINE
Filed July 18, 1932   3 Sheets-Sheet 2
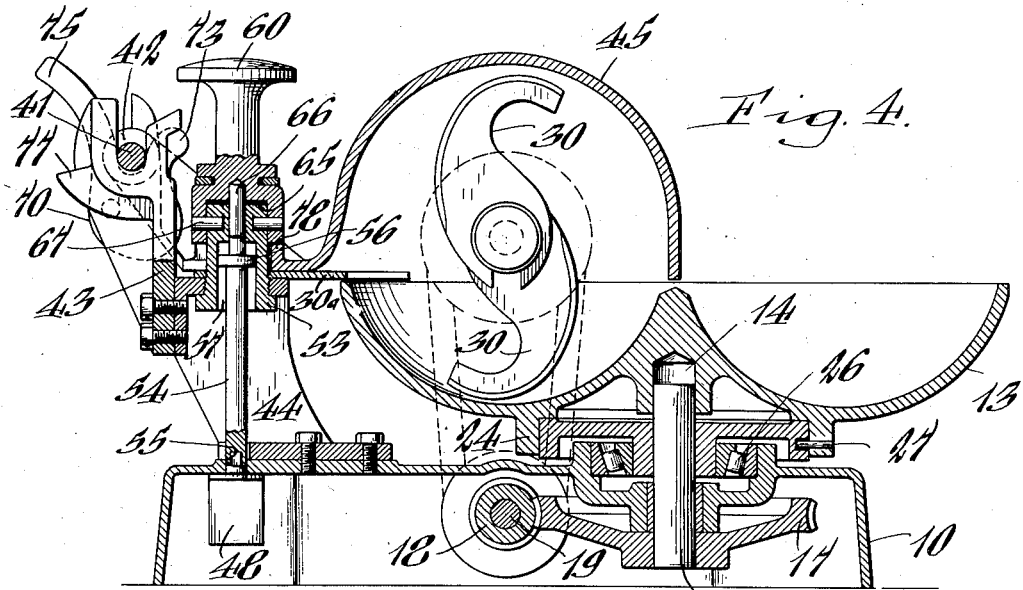
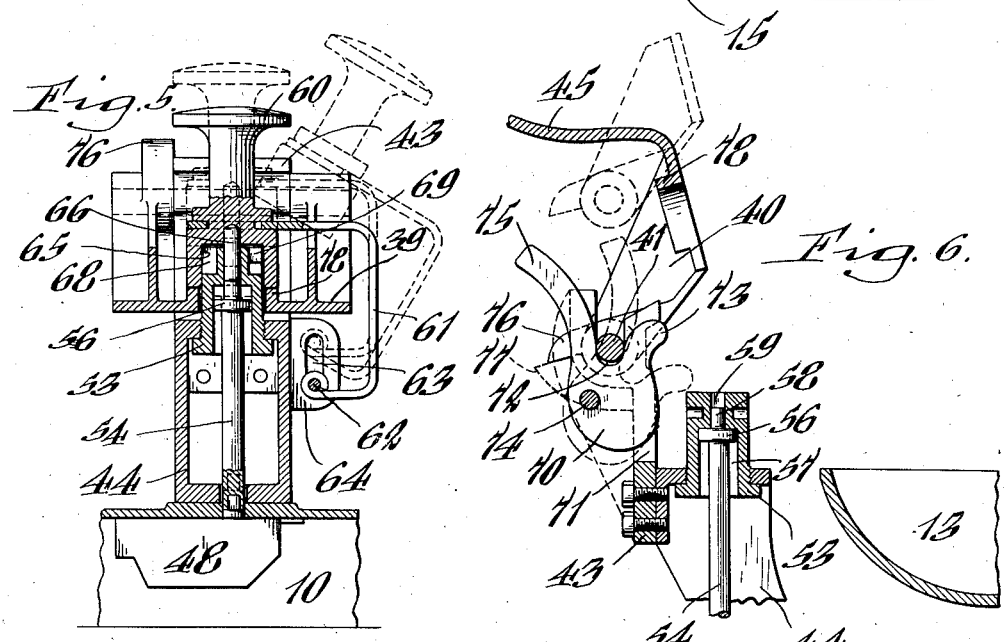
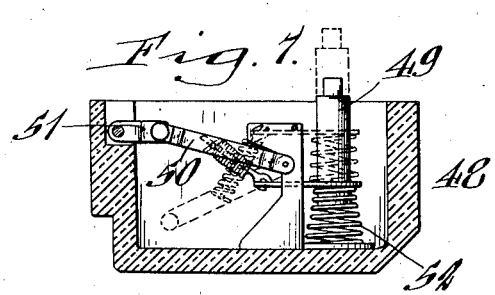
Inventor,
Adrian C. Van Hooydonk,
by Walter P. Geyer
Attorney.

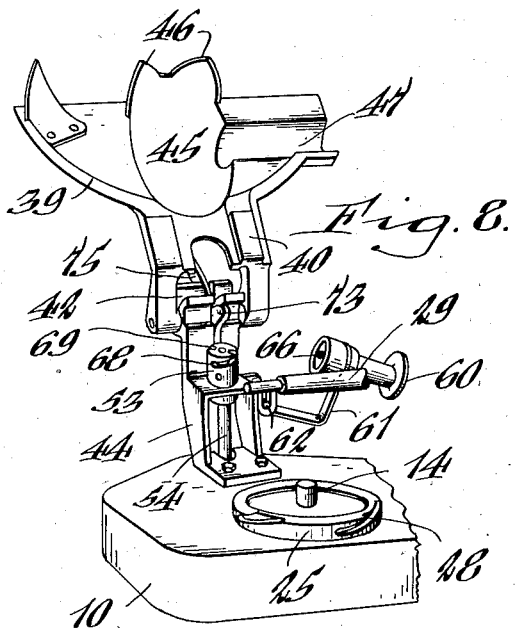
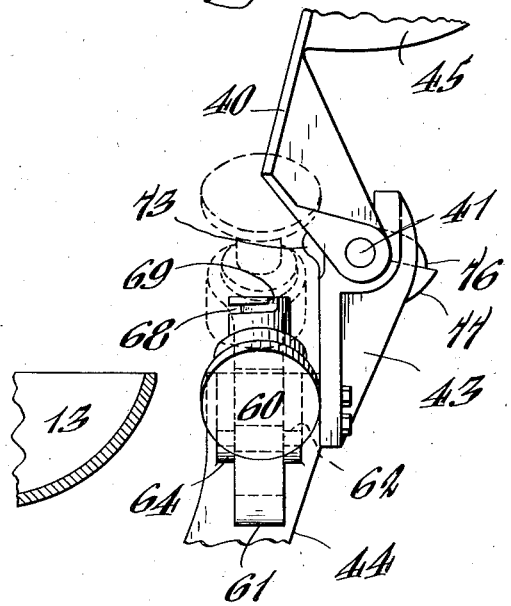
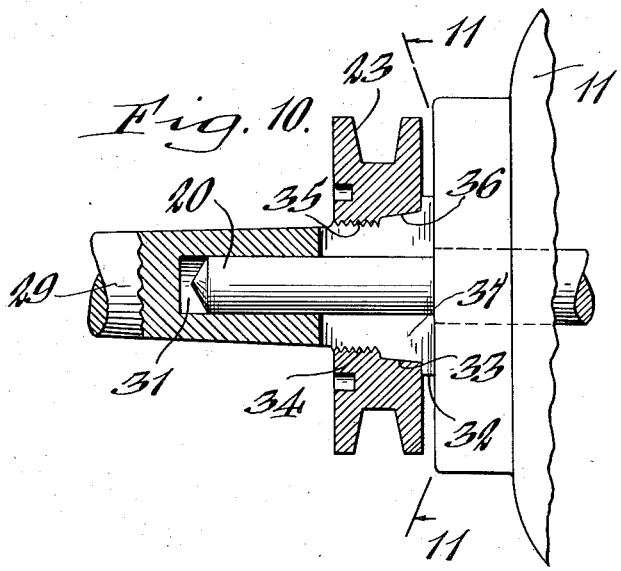

Patented June 2, 1936

2,043,216

UNITED STATES PATENT OFFICE 2,043,216

FOOD CHOPPING MACHINE

Adrian C. Van Hooydonk, Buffalo, N. Y., assignor to John E. Smith's Sons Company, Buffalo, N. Y., a corporation of New York Application July 18, 1932, Serial No. 623,042

12 Claims. (Cl. 146—67)

This invention relates to certain new and useful improvements in machines for chopping meat and other foods, and particularly to a machine of the type having a rotary meat bowl and revolving knives extending into the bowl for cutting the meat or other foods.

One of the chief objects of the invention is to provide a machine of this character whose parts are designed to afford the utmost safety to the operator at all times, and which provides means for automatically cutting out the motive power of the machine at those times other than the time when the machine is in position for operation.

Another object of the invention is to provide an electrically operated meat or food chopping machine having simple and positive means for breaking the circuit of the driving motor when the machine is in positions other than the normal operative position for chopping the foods.

A further object is to provide a simple and efficient machine of this character having improved means for mounting the knives in position relative to the bowl, and whereby such knives can be easily removed when desired for cleaning or replacement.

Other features of the invention reside in the construction and arrangement of parts hereinafter described and particularly pointed out in the appended claims.

In the accompanying drawings:—Figure 1 is a perspective view of a meat or food chopping machine embodying my invention. Figure 2 is a top plan view thereof. Figure 3 is an enlarged longitudinal section taken substantially in the plane of line 3—3, Figure 2. Figure 4 is an enlarged transverse section taken on line 4—4, Figure 2. Figure 5 is an enlarged vertical section taken on line 5—5, Figure 2. Figure 6 is a fragmentary sectional view, similar to Figure 4, showing the cover-plate in its elevated position and the safety switch mechanism in switch-opening position. Figure 7 is a sectional elevation of the safety switch. Figure 8 is a fragmentary perspective view of the machine with the cover-plate raised. Figure 9 is a fragmentary sectional side view showing the manner in which the cover-plate, when elevated, blocks the movement of the switch control member to switch-closing position. Figure 10 is a longitudinal section taken on line 10—10, Figure 3. Figure 11 is a cross section in the plane of line 11—11, Figure 10.

Similar characters of reference indicate corresponding parts throughout the several views.

The various working parts of the machine may be mounted on a suitable base adapted to rest upon a bench or counter, or the same may be mounted on a pedestal type of support. By way of example, I have shown the parts mounted on a suitable base type of support 10 having the driving unit of the machine, which preferably consists of an electric motor 11, mounted at one end thereof and including a manually controlled switch 12, while supported at the opposite end of the base alongside the motor is a revolving meat bowl 13 which may be of the usual concavo-convex form and is provided centrally of its body with a downwardly-opening socket 14 removably engaging the upper end of an upright shaft 15 journaled in a bearing collar 16 formed in the top wall of the base, the latter being preferably hollow for concealing the drive mechanism of the meat bowl. Secured to the lower end of the shaft 15 is a worm wheel 17 meshing with a worm 18 secured to a shaft 19 disposed lengthwise of the base in parallel relation to the motor shaft 20 and driven thereby preferably through the medium of a belt 21 and corresponding pulleys 22 and 23. Depending from the bowl and concentric with its socket 14 is a bearing flange or collar 24 detachably connected to a revolvable head 25 fixed on the shaft 15 and journaled in a roller bearing 26 fitted in the base, the connecting means between the bowl-flange and the revolvable head preferably consisting of radial coupling pins 27 projecting inwardly from the bowl-flange and engaging corresponding spiral-like grooves 28 formed in the peripheral edge of the revolvable head. These grooves are so disposed that they firmly lock the bowl down onto the head and prevent its vertical displacement, the bowl being readily removed for cleaning or other purposes by giving it a fraction of a turn relatively to the head to disengage its coupling pins from their companion grooves.

Disposed axially in line with the motor shaft 20 and operatively connected thereto to turn therewith, is a knife-shaft 29 which is disposed over the open top side of the bowl rearwardly of its axis and provided thereon with removable knives 30 which extend into the trough of the bowl for cutting the meat or other foods during its rotation. The means for connecting the knife-shaft to the motor-shaft are so designed that the pulley 23 acts as a coupling for uniting the two shafts in detachable engagement. For this purpose, the outer end of the knife-shaft has an axial socket 31 to receive the opposing attaching end of the motor shaft in the manner shown in Figures 3 and 10. As there shown, the extreme outer end of the knife-shaft terminates in an annular flange or stop shoulder 32 and immediately adjoining the same is an inwardly-tapering portion 33, while adjoining the latter is a comparatively short externally threaded portion 34. The pulley 23 is adapted to be detachably fitted to the tapered and threaded portions of the knife-shaft to abut at its outer side against the shoulder 32 and for this purpose is provided with an internally threaded portion 35 and a tapered bore portion 36. Radial slits 37 may be formed in the outer end of the knife-shaft so that when fitting the pulley in place, the same is not only firmly held on the knife shaft but in addition thereto it serves to firmly clamp the split end of the knife-shaft about the motor-shaft to positively couple the shafts together. If desired, a key 38 may also be employed for connecting the motor shaft to the knife-shaft.

Extending over the rear top portion of the bowl 13 is a cover-plate 39 mounted to swing vertically to assume a substantially horizontal position overhanging the bowl, as shown in Figures 1, 2, 3, and 4, or to assume a substantially upright position clear of the bowl, as seen in Figures 6, 8, and 9, and in which position the removal of the bowl may be effected when desired. To this end, the cover plate is preferably provided at its rear edge with laterally spaced hinge lugs or ears 40 carrying a pivot pin 41 disposed parallel to the knife-shaft 29, and removably seated in an upwardly-opening notch or seat 42 formed in the upper end of a hinge-plate 43 applied to a supporting bracket 44 bolted or otherwise secured to the rear portion of the base 10 and disposed substantially in line with the center of the bowl. Preferably formed integral with and disposed centrally of the cover-plate 39 is a knife guard or hood 45 which, in the lowered position of the cover-plate, encloses the knives 30, the front end of the hood terminating in depending wings or projections 46 which straddle the conical central portion of the bowl 13 and project somewhat rearwardly to shield the knives and to protect the hands of the operator from reaching into the knife-zone. That portion of the cover-plate extending over the knife-shaft 29, is arched, as indicated at 47, to form a housing or enclosure for the shaft in the closed position of the cover-plate.

Included in the circuit of and auxiliary to the manual motor switch 12 thereof, is an automatically controlled supplementary or safety switch, indicated generally by the numeral 48, which is so governed that it can only be closed to effect the operation of the machine when the cover-plate 39 is in its normal, closed position shown in Figures 1-4, inclusive. When the cover-plate is in its raised or elevated position, shown in Figures 6 and 7, the safety switch is open and the governing means thereof is so designed that it is impossible to close the switch in any position of the parts other than the normal position for operation, that is, with the cover-plate down. The mechanism for governing the safety switch is preferably constructed as follows:

The safety switch 48 may be disposed within the machine base 10 adjacent the rear side thereof and between the bowl axis and hinge axis of the cover-plate 39, as seen in Figure 4, where it is concealed and inaccessible for manual manipulation. This safety switch may be of any suitable and well known construction, that shown in the drawings including an actuating element 49 for governing the throwing of the switch arm 50 in switch-closing contact with the terminal 51. The actuating element of this switch, in the example shown, is disposed for vertical movement and a spring 52 applied thereto serves to constantly urge the same to its elevated switch-opening position. Supported at its upper end in a guide sleeve 53, detachably fitted by a screw or like connection to the bracket 44, is a vertically movable post or plunger 54 which is operatively connected at its lower end to the actuating element 49 of the safety switch, and for this purpose such end of the plunger may be provided with a socket 55 for receiving the upper end of said actuating element. As seen in Figures 4 and 6, the upper end of the plunger 54 has a collar 56 thereon slidingly engaging a socket 57 in the lower portion of the sleeve 53, and in the open position of the switch, this collar abuts against the resulting shoulder formed at the upper end of the socket, the spring 52 of the safety switch urging it to that position. Above the collar 56 and preferably in axial line with the plunger 54 is an actuating extension 58 which extends into an opening 59 in the top side of the sleeve, but which terminates short of the top side of said sleeve so that access thereto cannot ordinarily be had to depress the plunger by hand and close the switch 48. Said sleeve 53, in the closed position of the cover-plate 39, projects upwardly through the space or opening formed between the plate-hinge lugs 40, and cooperating therewith is a switch-closing control member which is so mounted as to be moved into and out of operative relation with the switch-actuating plunger-extension 58 only at a time when the cover-plate 39 is in its closed position.

This switch-closing control member preferably consists of an actuating knob 60 revolvably mounted on a vertically swinging yoke or strap 61 carrying a horizontal hinge pintle 62 at its lower end guided in a vertical slot 63 formed in a lug 64 projecting from the bracket 44, as seen in Figure 5. This strap is substantially of U-shape and its upper knob-carrying arm is adapted to extend over and bridge the rear portion of the cover plate in the manner shown by full lines in Figure 5, in which position the knob is in axial alinement with the actuating plunger 54 of the safety switch to effect the closing of the same. In its bottom side said knob has a socket 65 which is adapted to fit over the opposing top side of the sleeve 53 and into which projects an axially-disposed pin 66 for abutting engagement with the plunger-extension 58 to shift the plunger downwardly to close the switch 48 when a corresponding pressure is exerted on the knob. The hinge-pin slot 63 permits the strap to be bodily elevated to a position wherein the actuating knob is vertically displaced over the sleeve 53 after which the same is free to be bodily lowered to effect the closing of the switch.

For the purpose of holding or locking the switch plunger 54 in its downward switch-closing position against the resistance of the spring 52, I provide the opposing ends of the sleeve 53 and knob 60 with coupling elements which are arranged to effect the coupling and uncoupling of the knob to the sleeve preferably by a revolving action of said knob. To this end, the latter has radial coupling pins 67 projecting inwardly into its socket 65 for engaging companion annular grooves 68 formed in the upper portion of the sleeve 53, each of said grooves having an upright escapement portion 69 for effecting the insertion and removal of the coupling pins to and from operative engagement with said grooves. In the interlocked or coupled position of the knob with the sleeve, the plunger 54, is effectually held in its depressed switch-closing position. Upon releasing the knob from coupling engagement with the sleeve by a fractional turn thereof, the plunger is automatically elevated to switch-opening position, and the knob-carrying straps 61 can be swung to one side, as seen in Figure 8, permitting the cover-plate to be raised and removed, if desired.

When the switch-actuating knob 60 is uncoupled to automatically effect the opening of the safety switch 28, the cover-plate 39 can be raised to its elevated position for any purpose desired. However, in this elevated position, it is impossible to close the safety switch for the reason that in this position of the parts the hinged end of the cover-plate lies in the path of swinging movement of the knob-carrying strap 61 and thereby prevents the knob being brought into operative engagement with the switch-controlling plunger 54, thereby effectually guarding against the application of power to rotate the meat bowl and the knives when the cover-plate is in its elevated position.

As heretofore described, the pivot or hinge pin 41 of the cover-plate 39 is seated in notches 42 formed in the hinge-plate 43, and should it be desired to effect the complete removal of the cover-plate from the machine, this can be readily done by simply withdrawing such hinge pin from its notches, as seen by dotted lines in Figure 6. Unless some provision were made to guard against it, however, when the cover-plate is removed from the machine, the switch-controlling knob 60 could be brought into operative engagement with the plunger 54 to close the switch 48 and rotate the bowl 13 and knives 30 and expose the operator to accidental injury. In order to prevent the occurrence of such a condition, I provide a trip guard or member 70 which is arranged to automatically assume a position over the sleeve 53 immediately upon the cover-plate being removed from the machine, and thereby serve to prevent and baffle any attempt to bring the control knob 60 into switch-closing position. This trip guard is disposed in an upright notch or recess 71 formed in the hinge-plate 43 at a point transversely in line with the sleeve 53 and is provided with an upwardly-opening notch or recess 72 which is normally disposed in register with the companion notch 42 of the hinge-plate for receiving the cover hinge-pin 41, the latter holding the trip guard in its normally inoperative position as long as the cover-plate is in place on the machine. As soon as the cover-plate is removed, this trip guard is adapted to swing in a direction to bring its blocking finger 73 in overhanging relation to the top side of the sleeve 53, as shown by dotted lines in Figure 6, and to permit this movement said guard is pivoted at 74 to its attaching plate 43 and is weighted forwardly of its pivot to automatically effect the swinging of the guard to its operative baffling position. If desired, the trip guard may be provided at its rear side with an upwardly and rearwardly extending projection 75, which serves as a guide for leading the cover-plate hinge pintle 41 into register with the receiving notch 42 in the hinge-plate 43.

By this construction, when the cover-plate is removed, the trip guard is automatically swung forward by gravity and its blocking finger assumes a position overhanging the sleeve 53, thereby preventing the actuating knob 60 being brought into coupling engagement with the switch-controlling plunger 54 and guarding against the closing of the switch under such conditions. As soon as the cover-plate is applied, its hinge pin 41 retracts the trip guard 70 from its operative position and retains it in the position shown by full lines in Figure 6 as long as the cover-plate is in its hinged position on the machine.

To prevent the cover-plate 39 from swinging beyond a predetermined open position, a stop lug 76 is provided adjacent its hinged end which is adapted to engage a corresponding stop shoulder 77 formed on the hinge-plate 42.

As shown in Figure 4, a comb plate 30ᵃ is disposed in cooperative relation to the knives 30 and is supported on the top side of the bracket 44 about the guide sleeve 53. In the closed position of the cover-plate 39, the same rests forwardly of its hinged end on the outer top face of the comb-plate, and the bottom of the switch-actuating knob 60 rests upon the adjoining face or shoulder 78 provided on the top side of the cover-plate, thereby firmly and securely holding the latter and the comb-plate in position.

I claim as my invention:—

1. A machine of the character described, comprising a rotary container, an electric motor for driving said container, a switch for said motor, a cover-plate movable to an open and closed position over said container, and pivoted means disposed in operative relation to said cover-plate for moving into and out of overlying relation thereto and including a part for throwing the motor-switch to its closed position only when the cover plate is in its closed position and said pivoted means is in overlying relation thereto.

2. A machine of the character described, comprising a rotary container, driving means therefor, a cover-plate for said container movable to an open and closed position, a control member for said driving means, and a shiftable means movable to a position overlying the cover and carrying an actuating element for said control member movable relatively to said shiftable means into and out of operative engagement with the control member.

3. A machine of the character described, comprising a rotary container, driving means therefor, a cover-plate for said container movable to an open and closed position, a control member for said driving means exposed through a portion of the cover, and a shiftable actuating means for said control member including a swinging yoke movable into and out of overlying relation to said cover only when the latter is in its closed position and having a part movable relatively to the yoke for actuating the control member when said yoke is in its overlying position to the cover to govern said driving means.

4. A machine of the character described, comprising a rotary container, driving means therefor, a cover-plate for said container movable to an open and closed position, a control member for said driving means exposed through a portion of the cover, and a shiftable means movable to a position in overlying clamped relation to the cover in its closed position and in cooperative relation to said control member for actuating the same to govern the driving means, said shiftable means being movable to a position away from the cover when it is desired to open the same, said cover in its open position obstructing the movement of the shifting means to a position in cooperative relation to the control member.

5. A machine of the character described, comprising a rotary container, driving means therefor, a cover-plate for said container movable to an open and closed position, a control member for said driving means exposed through a portion of the cover, a shiftable actuating means for said control member movable into and out of overlying relation to said cover only when the latter is in its closed position to govern said driving means control member, and means for obstructing the movement of said shiftable actuating means into operative relation to said control member when the cover is open.

6. A machine of the character described, comprising a support, a rotary container mounted thereon, driving means therefor, a cover-plate removably mounted on said support to assume a closed position over the container, a control member for said driving means exposed through a portion of the cover in its closed position, manually-movable means for actuating said control member only when the cover is closed, and means automatically movable to a baffling position relative to said control member when said cover is removed to render said actuating means immovable to a position to actuate the control member.

7. A machine of the character described, comprising a support, a rotary container mounted thereon, driving means therefor, a cover-plate removably hinged on said support to assume a closed position over the container or an open elevated position relative thereto, a control member for said driving means exposed through a portion of the cover in its closed position, shiftable actuating means for said control member movable into operative overlying relation to said cover only when the latter is closed to govern the control member of said driving means, said shiftable means being movable to an inoperative position to permit the opening of the cover, the latter in its open position obstructing the movement of the shifting means to a position in operative relation to the control member, and means automatically movable to a baffling position relative to said control member when the cover is removed to render said actuating means immovable to a position to actuate the control member.

8. A machine of the character described, comprising a rotary container, driving means therefor, a cover-plate for said container movable to an open and closed position, a control member for said driving means, a pivoted yoke having a portion arranged to overhang the cover-plate in one position thereof in substantially operative alinement with said control member, and means movable relatively to and carried by the overhanging portion of said yoke and engageable with said control member, in the overhanging position of the yoke, to actuate said control member.

9. A machine of the character described, comprising a rotary container, driving means therefor, a cover-plate for said container movable to an open and closed position, a control member for said driving means, a pivoted yoke having a portion arranged to overhang the cover-plate in one position thereof, means carried by said yoke and engageable with said control member, in the overhanging position of the yoke, to actuate said control member, and means for detachably coupling said control member engaging means in position to render the driving means operative.

10. A machine of the character described, comprising a rotary container, an electric motor for driving said container, a switch for said motor, a cover-plate movable to an open and closed position over said container, a switch-control member having a portion exposed through the cover-plate in its closed position, and a pivoted yoke movable into and out of overhanging relation to the cover-plate and having a part engageable with said switch-control member for actuating it only when the cover-plate is closed.

11. In a meat cutting machine, the combination of a support, a rotary bowl mounted thereon, revolving cutting means extending into the bowl, an electric motor for driving said bowl and said cutting means, a hinged cover-plate arranged over the bowl, a safety switch for the motor including a control element adapted to be exposed through the cover in the closed position thereof, a yoke movable into and out of overhanging relation to said cover, and an actuating member applied to said yoke and engageable with said switch control element in the closed position of the cover.

12. In a meat cutting machine, the combination of a support, a rotary bowl mounted thereon, revolving cutting means extending into the bowl, an electric motor for driving said bowl and said cutting means, a hinged cover-plate arranged over the bowl, a normally-open safety switch for the motor, a guide member mounted on said support and exposed through the cover in its closed position and having an opening therein, a control element for said switch projecting through said guide member opening and terminating short of its exposed upper end, a yoke movable into and out of overhanging relation to said cover-plate, and an actuating member applied to said yoke and movable into and out of operative relation with said control element when the cover is closed and having a part arranged to be projected into said guide member opening for engagement with said switch control element.

ADRIAN C. VAN HOOYDONK.